United States Patent [19]

Inoue et al.

[11] Patent Number: 4,495,773
[45] Date of Patent: Jan. 29, 1985

[54] TURBOCHARGER FOR MOTORCYCLES

[75] Inventors: Kazuo Inoue, Tokyo; Kentaro Kato, Saitama, both of Japan

[73] Assignee: Honda Giken Kogyo Kabushiki Kaisha, Tokyo, Japan

[21] Appl. No.: 303,144

[22] Filed: Sep. 17, 1981

[30] Foreign Application Priority Data

Sep. 17, 1980 [JP] Japan ................. 55-128014

[51] Int. Cl.³ ........................... F02B 37/00
[52] U.S. Cl. ..................... 60/605; 180/219
[58] Field of Search .......... 60/597, 598, 605, 606, 60/612

[56] References Cited

U.S. PATENT DOCUMENTS

| | | | |
|---|---|---|---|
| 2,200,744 | 5/1940 | Heinzelmann | 60/612 |
| 2,306,277 | 12/1942 | Oswald | 60/612 X |
| 2,444,644 | 7/1948 | Füllemann | 60/612 X |
| 2,963,863 | 12/1960 | Middlebrooks, Jr. | 60/605 |
| 3,488,944 | 1/1970 | Saletzki et al. | 60/605 |
| 4,159,627 | 5/1979 | Mönch et al. | 60/605 |
| 4,294,073 | 10/1981 | Neff | 60/597 |

FOREIGN PATENT DOCUMENTS

| | | | |
|---|---|---|---|
| 64337 | 5/1979 | Japan | 60/605 |
| 47909 | 9/1979 | Japan | 60/605 |
| 48001 | 1/1980 | Japan | 60/605 |
| 193016 | 10/1923 | United Kingdom | 60/605 |
| 2069604 | 9/1981 | United Kingdom | 60/605 |

Primary Examiner—Michael Koczo
Assistant Examiner—Peggy A. Neils
Attorney, Agent, or Firm—Lyon & Lyon

[57] ABSTRACT

A motorcycle with a two-cylinder V-type engine employs an exhaust manifold comprising exhaust pipes connected to the engine cylinders and extending laterally inward to a central tubular support in front of the engine. A turbocharger device mounted on said support includes a turbine driven by exhaust gases from the exhaust manifold and an air compressor coupled to the turbine to deliver air under pressure to the intake system of the engine.

6 Claims, 4 Drawing Figures

TURBOCHARGER FOR MOTORCYCLES

This invention relates to a turbocharger device for a motorcycle or an autobicycle having a multicylinder engine.

It is an object of this invention to provide a central support in front of the engine to carry the turbocharger, the support comprising a portion of the exhaust manifold leading from the engine cylinders. The turbocharger comprising an exhaust turbine and a direct coupled air compressor are thus received in a space-saving manner immediately in front of the engine.

Other and more detailed objects and advantages will appear hereinafter.

Figure 1:
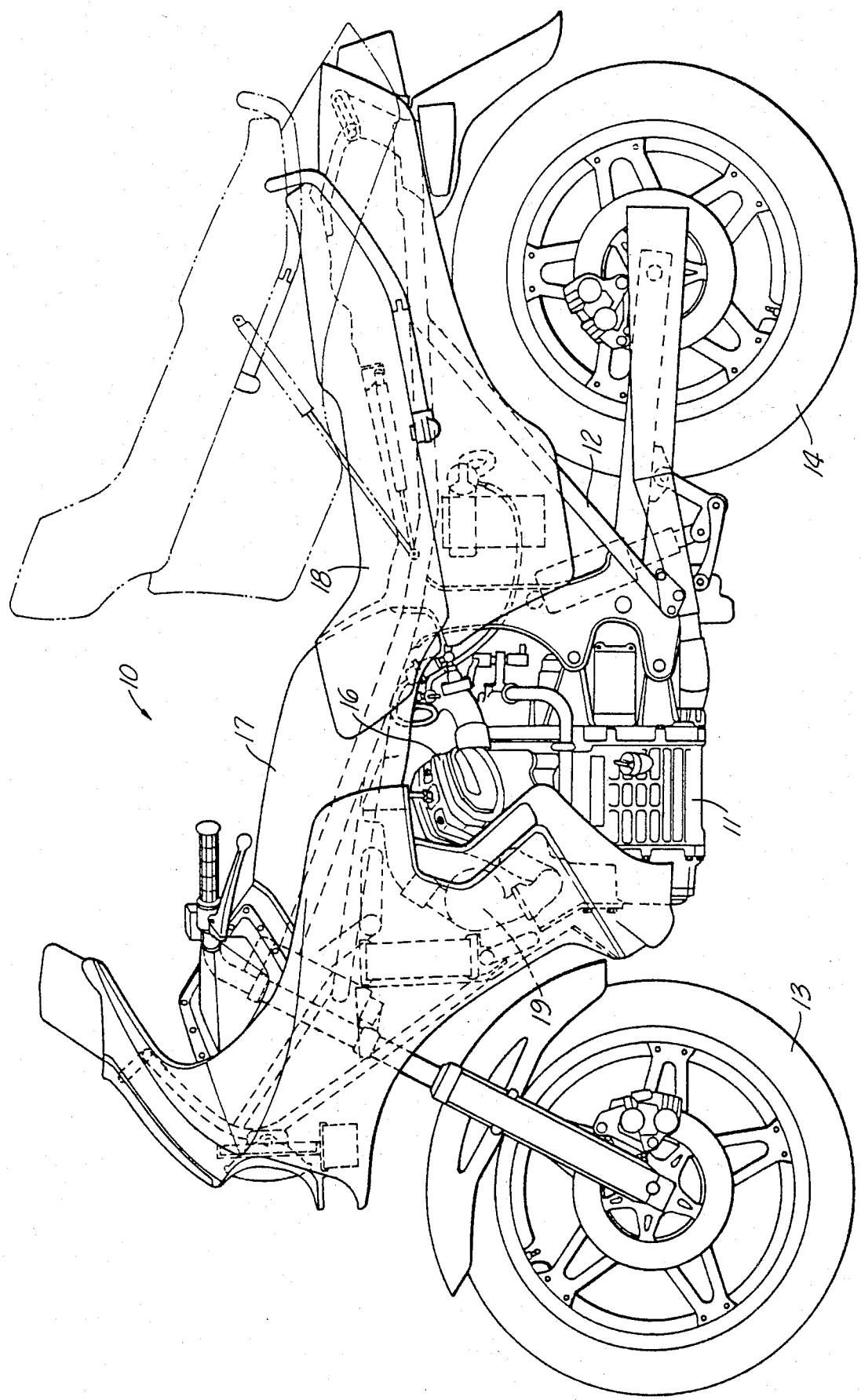
FIG. 1 is a side elevation showing a motorcycle equipped with a turbocharger device constituting a preferred embodiment of this invention.
Figure 2:
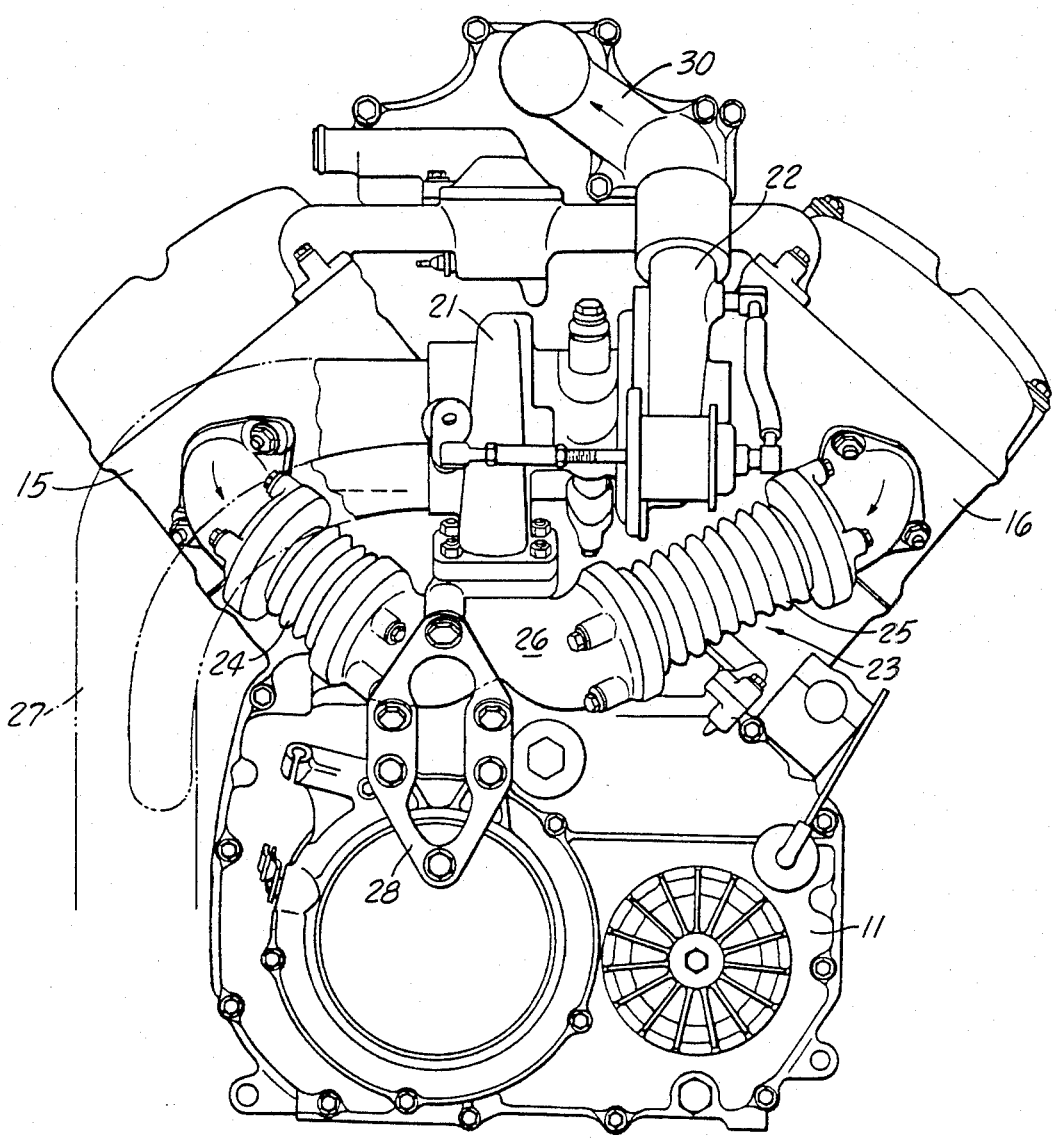
FIG. 2 is a front view, certain parts being omitted for clarity of illustration.
Figure 4:
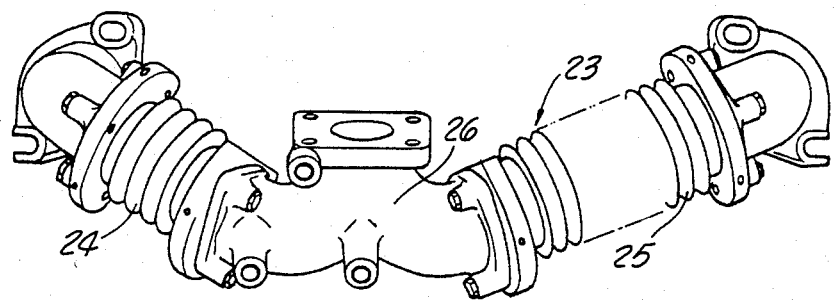
FIG. 4 is a front view of the exhaust manifold and central tubular support.
Figure 3:
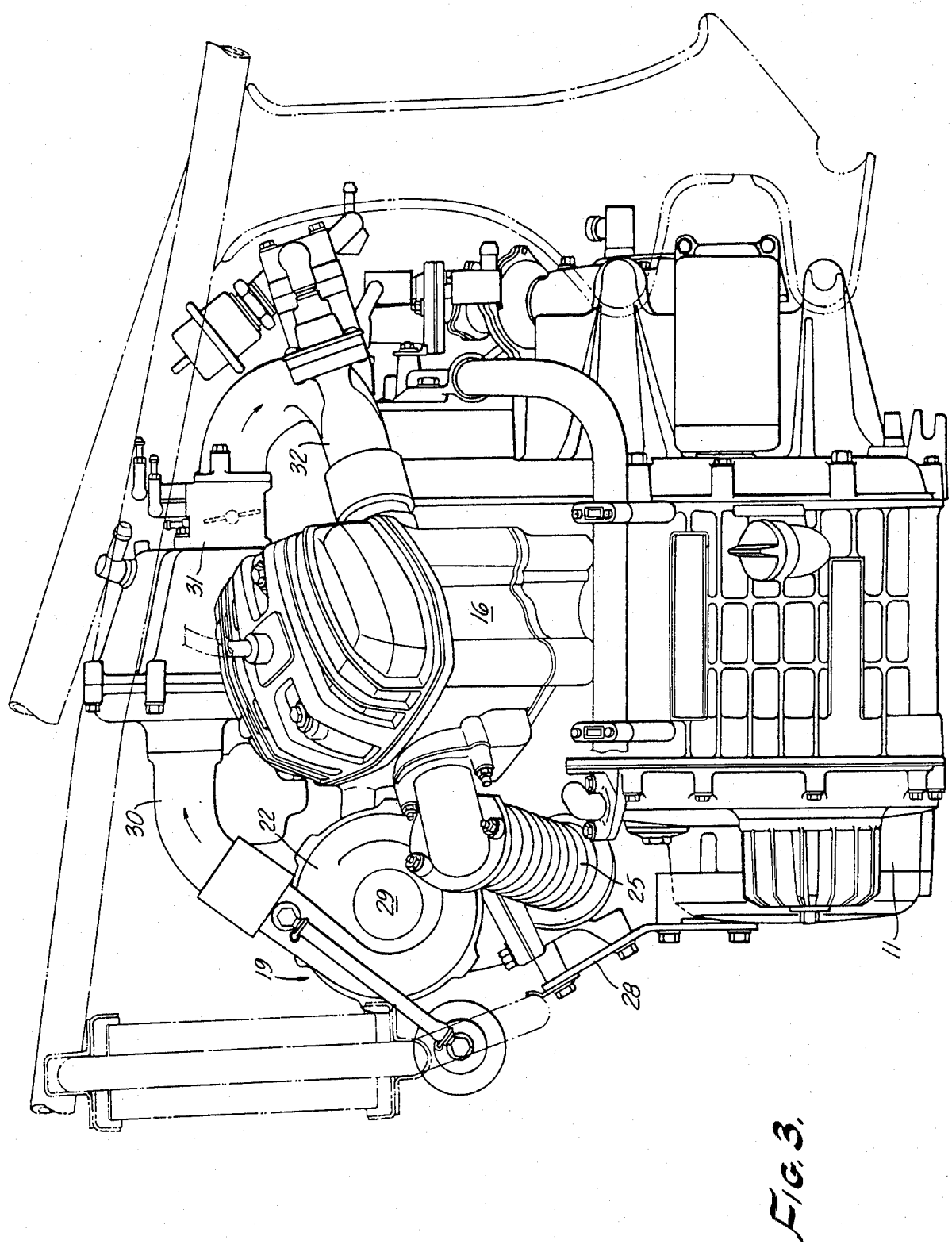
FIG. 3 is an enlargement of a portion of FIG. 1, certain parts being omitted for clarity of illustration.

Referring to the drawings, the motorcycle generally designated 10 has an engine 11 supported on a body frame 12 between front and rear wheels 13 and 14. The illustrated engine 11 has two cylinders 15 and 16 symmetrically positioned in a "V" with respect to the fore and aft axis of the engine. The fuel tank is shown at 17 and the rider's seat is shown at 18.

In accordance with this invention, a turbocharger 19 is positioned in front of the engine 11 and includes an exhaust turbine 21 direct coupled to drive an air compressor 22. An exhaust manifold 23 includes exhaust pipes 24 and 25 leading from engine cylinders 15 and 16, respectively. These exhaust pipes include expansible bellows sections to accommodate thermal expansion. The exhaust pipes 24 and 25 lead to a central hollow support 26. The exhaust turbine 21 is fixed on the central hollow support 26, receiving the exhaust gases therefrom and discharging the exhaust gases through exhaust passage 27. A stationary bracket 28 is fixed on the engine 11 and carries the central hollow support 26.

The air compressor 22 is direct connected to the exhaust turbine 21 and is driven thereby. Air enters the compressor 22 through the inlet opening 29 and discharges it through the piping 30 which constitutes the intake system for the engine.

Compressed air is delivered to the carburetor 31, and the air-fuel mixture reaches the cylinders through the pipes 32.

Summarizing, the turbocharger is positioned in front of the engine and carried upon a common connecting portion of the exhaust manifold extending from the respective cylinders. Accordingly, the relatively large space in front of the engine is advantageously used, permitting the turbocharger to be accommodated in a space-saving location.

Having fully described our invention, it is to be understood that we are not to be limited to the details herein set forth but that our invention is of the full scope of the appended claims.

We claim:

1. A turbocharger system for a motorcycle having a multicylinder V-engine with a crankshaft, the engine being supported on a body frame between front and rear wheels with the centerline of the engine extending fore-and-aft of the motorcycle, the turbocharge system comprising
   an exhaust manifold including a hollow support rigidly fixed to the engine and exhaust pipes connected to the engine cylinders and extending toward the axis of the crankshaft and converging to said hollow support; and
   a turbocharger mounted to and positioned atop said hollow support adjacent one end of the V of the multicylinder V-engine and including an engine intake pipe extending toward the engine.

2. The turbocharger system of claim 1 wherein said exhaust pipes are connected to the engine cylinders on one side of the engine, said hollow support being located on the same side of the engine.

3. A turbocharger system for a motorcycle having a multicylinder engine with a crankshaft, the engine being supported on a body frame between front and rear wheels, the turbocharger system comprising
   an exhaust manifold including a hollow support rigidly fixed to the engine and exhaust pipes connected to the engine cylinders and extending toward the axis of the crankshaft and converging to said hollow support; and
   a turbocharger mounted to and positioned atop said hollow support, said turbocharger extending to between said exhaust pipes and including an engine intake pipe extending from said turbocharger toward the engine.

4. A turbocharger system for a motorcycle having a multicylinder engine with a crankshaft, the engine being supported on a body frame between front and rear wheels, the turbocharger system comprising
   an exhaust manifold including a hollow support rigidly fixed to the engine and exhaust pipes connected to the engine cylinders and extending toward the axis of the crankshaft and converging to said hollow support, said exhaust pipes including expansible bellows sections; and
   a turbocharger mounted to and positioned atop said hollow support, said turbocharger extending to between said exhaust pipes and including an engine intake pipe extending from said turbocharger toward the engine.

5. The turbocharger system of claim 3 wherein said exhaust pipes are connected to the engine cylinders on one side of the engine, said hollow support being located on the same side of the engine.

6. A turbocharger system for a motorcycle having a multicylinder V-engine with a crankshaft, the engine being supported on a body frame between front and rear wheels with the centerline of the engine extending fore-and-aft of the motorcycle, the turbocharger system comprising
   an exhaust manifold including a hollow support rigidly fixed to the engine and exhaust pipes connected to the engine cylinders and extending toward the axis of the crankshaft and converging to said hollow support, said exhaust pipes including expansible bellows sections; and
   a turbocharger mounted to and positioned atop said hollow support adjacent one end of the V of the multicylinder V-engine and including an engine intake pipe extending toward the engine.

* * * * *